Figure 1:
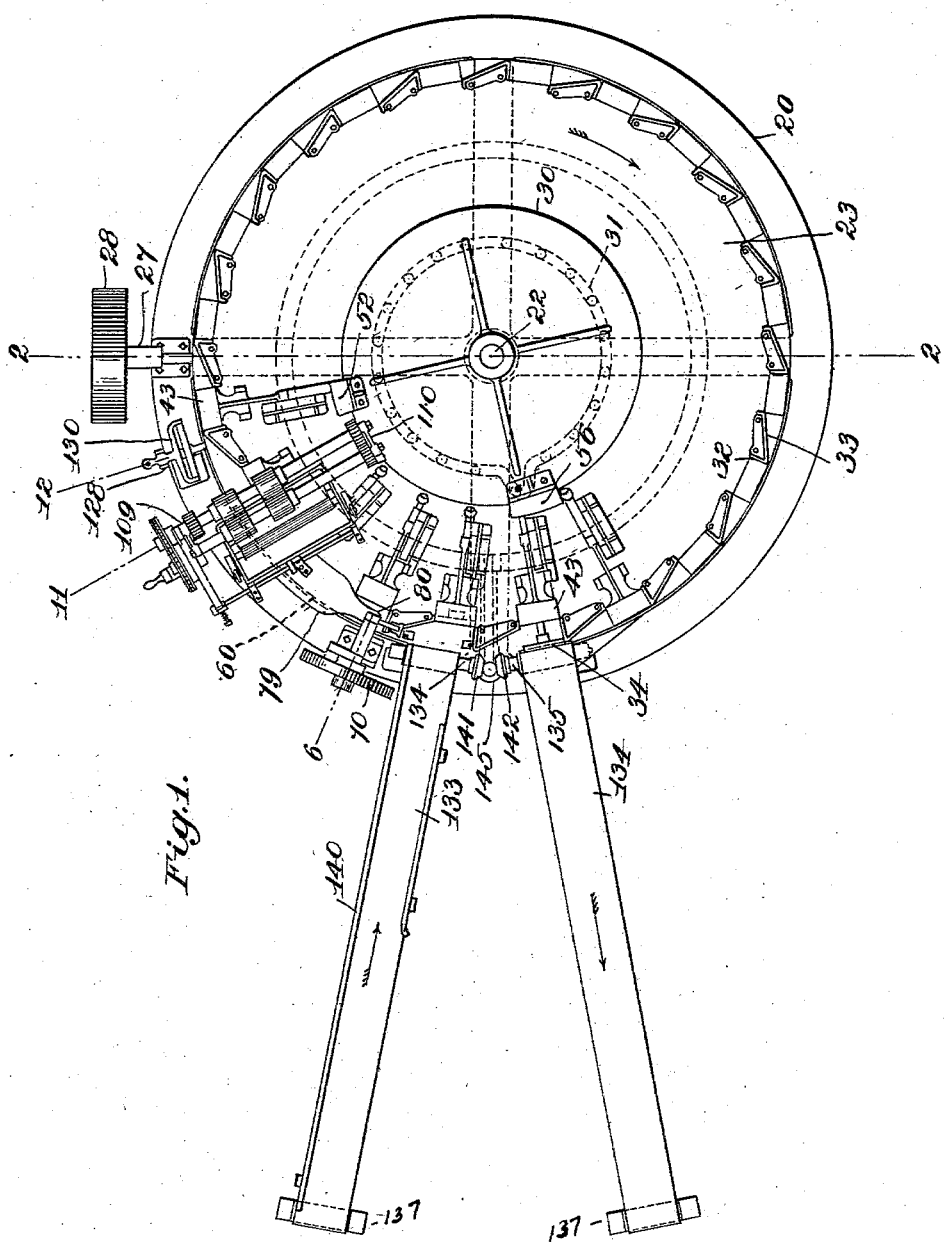

No. 752,369. PATENTED FEB. 16, 1904.
G. R. WYMAN.
MACHINE FOR CLOSING AND SEALING CARTONS.
APPLICATION FILED SEPT. 11, 1903.
NO MODEL. 9 SHEETS—SHEET 1.

Witnesses: Inventor:
George R. Wyman
By Henry J. Miller
atty.

No. 752,369. PATENTED FEB. 16, 1904.
G. R. WYMAN.
MACHINE FOR CLOSING AND SEALING CARTONS.
APPLICATION FILED SEPT. 11, 1903.
NO MODEL. 9 SHEETS—SHEET 4.

Witnesses:

Inventor:
George R. Wyman
By Henry J. Miller
atty.

No. 752,369. PATENTED FEB. 16, 1904.
G. R. WYMAN.
MACHINE FOR CLOSING AND SEALING CARTONS.
APPLICATION FILED SEPT. 11, 1903.
NO MODEL. 9 SHEETS—SHEET 5.
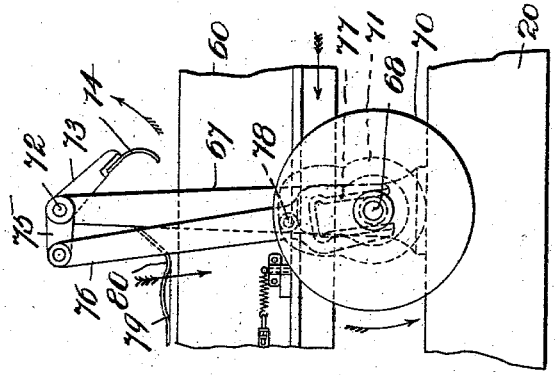
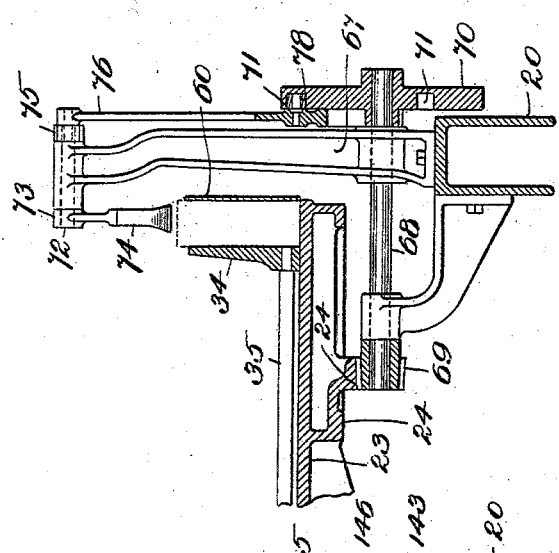
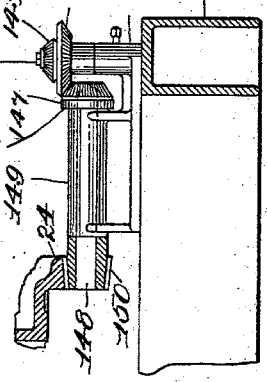
Witnesses:
Inventor:
George R. Wyman
By Henry J. Miller
atty.

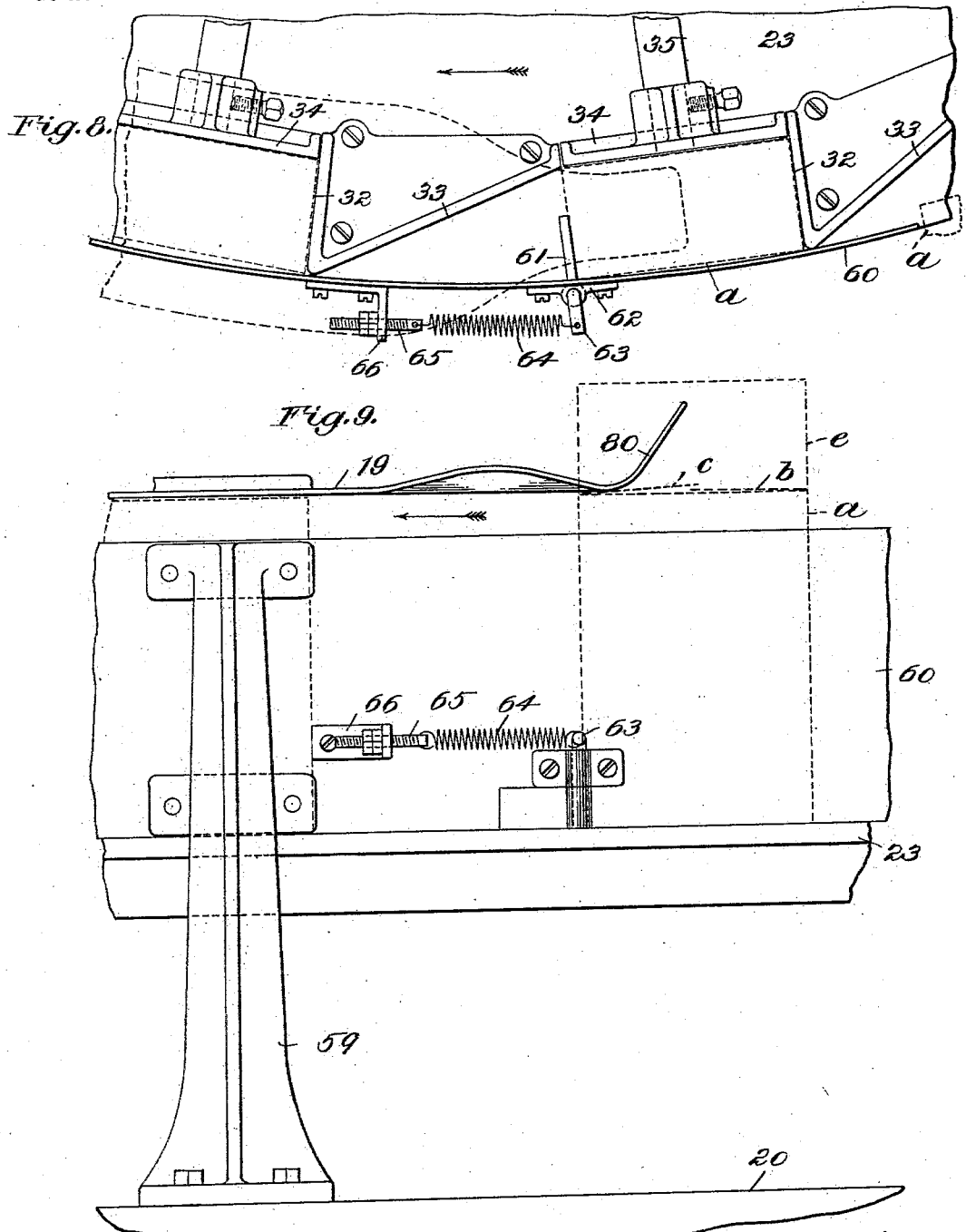

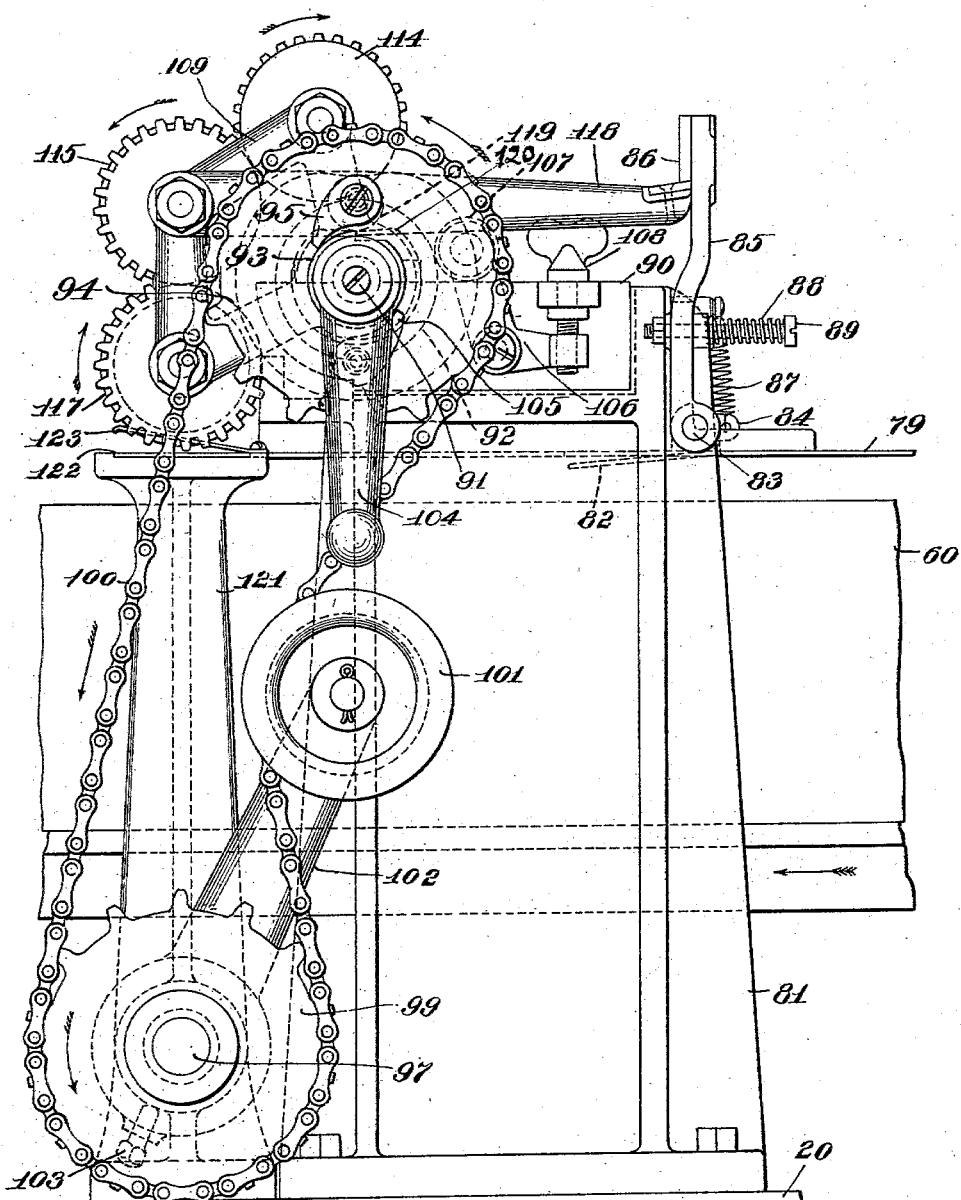

No. 752,369. PATENTED FEB. 16, 1904.
G. R. WYMAN.
MACHINE FOR CLOSING AND SEALING CARTONS.
APPLICATION FILED SEPT. 11, 1903.
NO MODEL. 9 SHEETS—SHEET 8.

Witnesses:   Inventor:
              George R. Wyman
              by Henry J. Miller
              atty No. 752,369. PATENTED FEB. 16, 1904.
G. R. WYMAN.
MACHINE FOR CLOSING AND SEALING CARTONS.
APPLICATION FILED SEPT. 11, 1903.
NO MODEL. 9 SHEETS—SHEET 9.
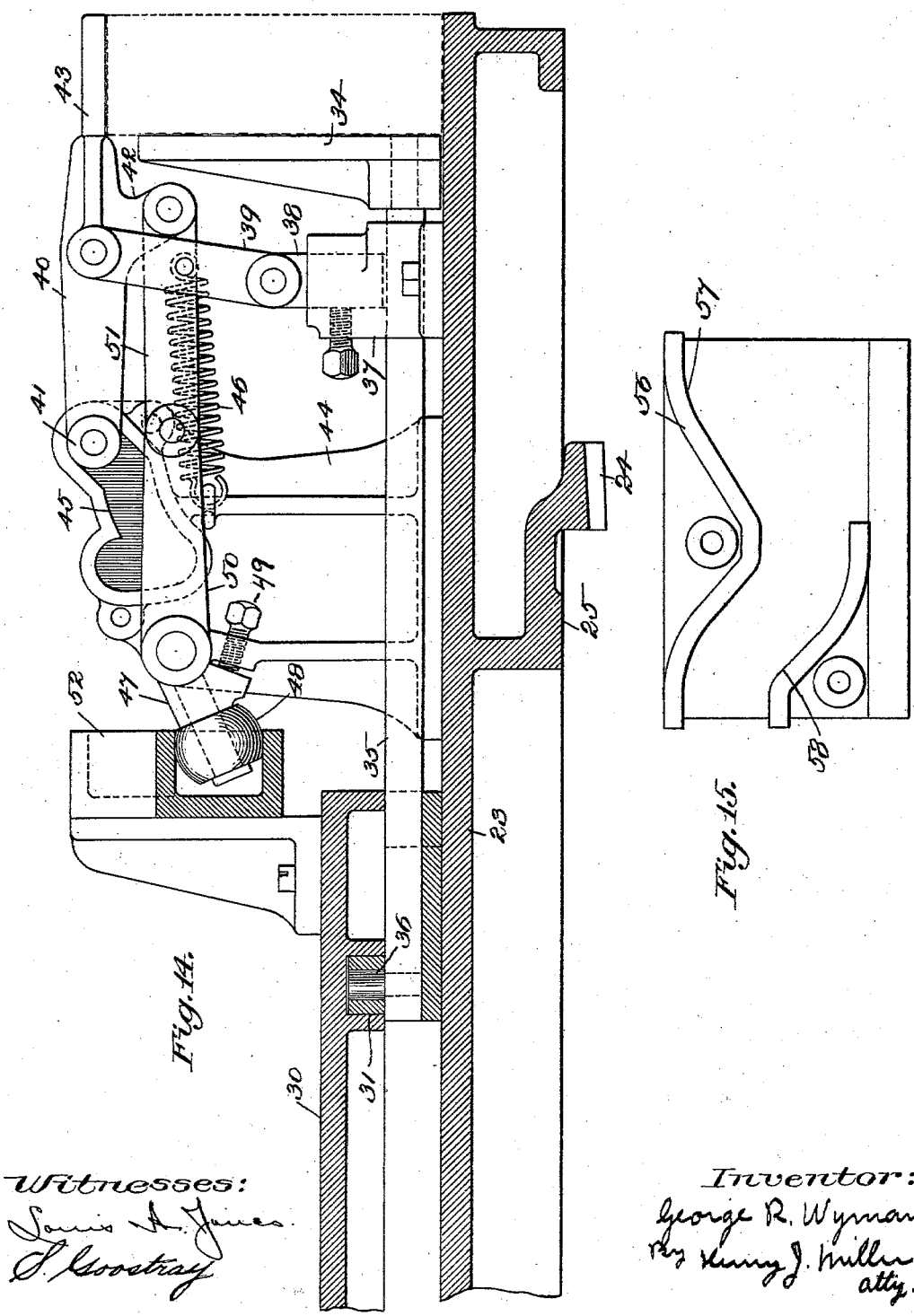

No. 752,369.

Patented February 16, 1904.

UNITED STATES PATENT OFFICE.

GEORGE R. WYMAN, OF EAST WALPOLE, MASSACHUSETTS, ASSIGNOR TO F. W. BIRD & SON, OF EAST WALPOLE, MASSACHUSETTS, A FIRM.

MACHINE FOR CLOSING AND SEALING CARTONS.

SPECIFICATION forming part of Letters Patent No. 752,369, dated February 16, 1904.

Application filed September 11, 1903. Serial No. 172,754. (No model.)

*To all whom it may concern:*

Be it known that I, GEORGE R. WYMAN, of East Walpole, in the county of Norfolk and State of Massachusetts, have invented certain new and useful Improvements in Machines for Closing and Sealing Cartons, of which the following is a specification, reference being had therein to the accompanying drawings.

This invention has reference to improvements in machines for closing and sealing the end flaps of cartons or boxes.

The invention relates more particularly to improvements in machines adapted to receive cartons or wrappers having end flaps preferably sufficiently filled to render the body of the carton stable under the operations of the machine, such operations consisting in mechanically and progressively folding downward the first pair of flaps, applying glue to the surfaces of the second pair of flaps and folding the first of this latter pair of flaps down onto the first pair of flaps and then folding and pressing the last flap onto the first of said second pair of flaps, maintaining the pressure to set the glue, and finally ejecting the closed and sealed carton from the machine.

The invention consists in the means for feeding the cartons to the machine.

The invention also consists in the means for feeding the cartons in combination with means for turning inward the first pair of flaps.

The invention also consists in a continuous carton feed in combination with the carrier for engaging a carton and moving it from said feeding means.

The invention also consists in the peculiar construction of the carrier.

The invention also consists in the construction of the carrier and of the folding mechanism coöperating therewith.

The invention also consists in the construction of the carrier and in the means for positioning a carton thereon.

The invention also consists in the means for closing down the first pair of flaps.

The invention still further consists in the glue or cement applying means and in the detector-controlled tripping mechanism therefor.

The invention also consists in means for folding inward the first pair of flaps of a carton, means for turning inward the fourth flap sufficiently to hold said first pair of flaps down without interfering with the swinging down of the third flap, and means for turning down the third flap, the mechanism acting on the fourth flap being designed to turn said flap down onto the third flap.

The invention also consists in the construction of the mechanism for turning down the fourth flap and in means for operating the same.

The invention also consists in the means for reinforcing the carton at the time of folding downward the last flap.

The invention also consists in the ejector mechanism.

The invention also consists in the ejector mechanism in combination with the means for receiving the sealed carton as it is ejected from the carrier.

The invention consists in such other peculiar features of construction and combination of parts as shall hereinafter be more fully described in their preferred form and pointed out in the claims.

Figure 2:
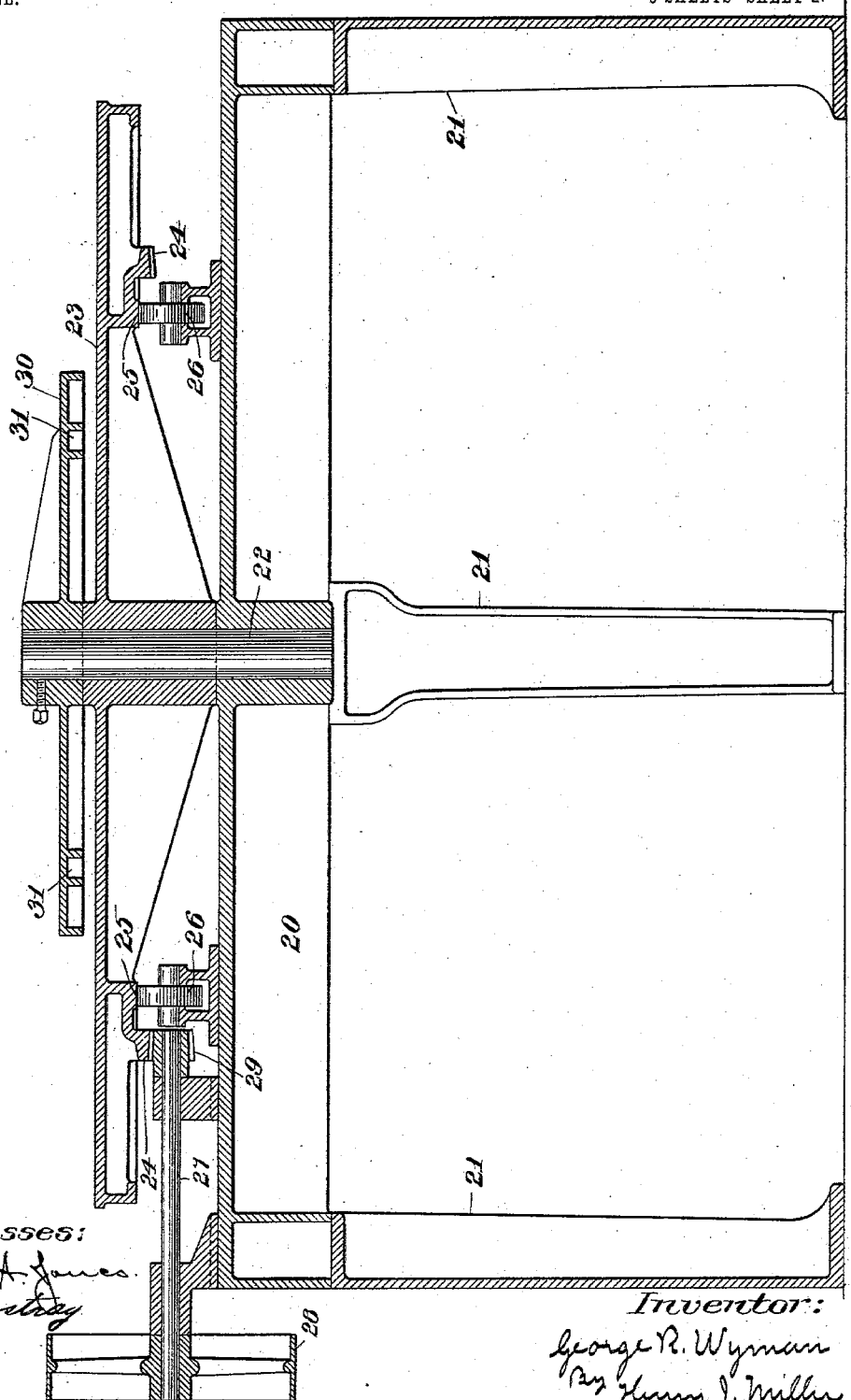
Figure 3:
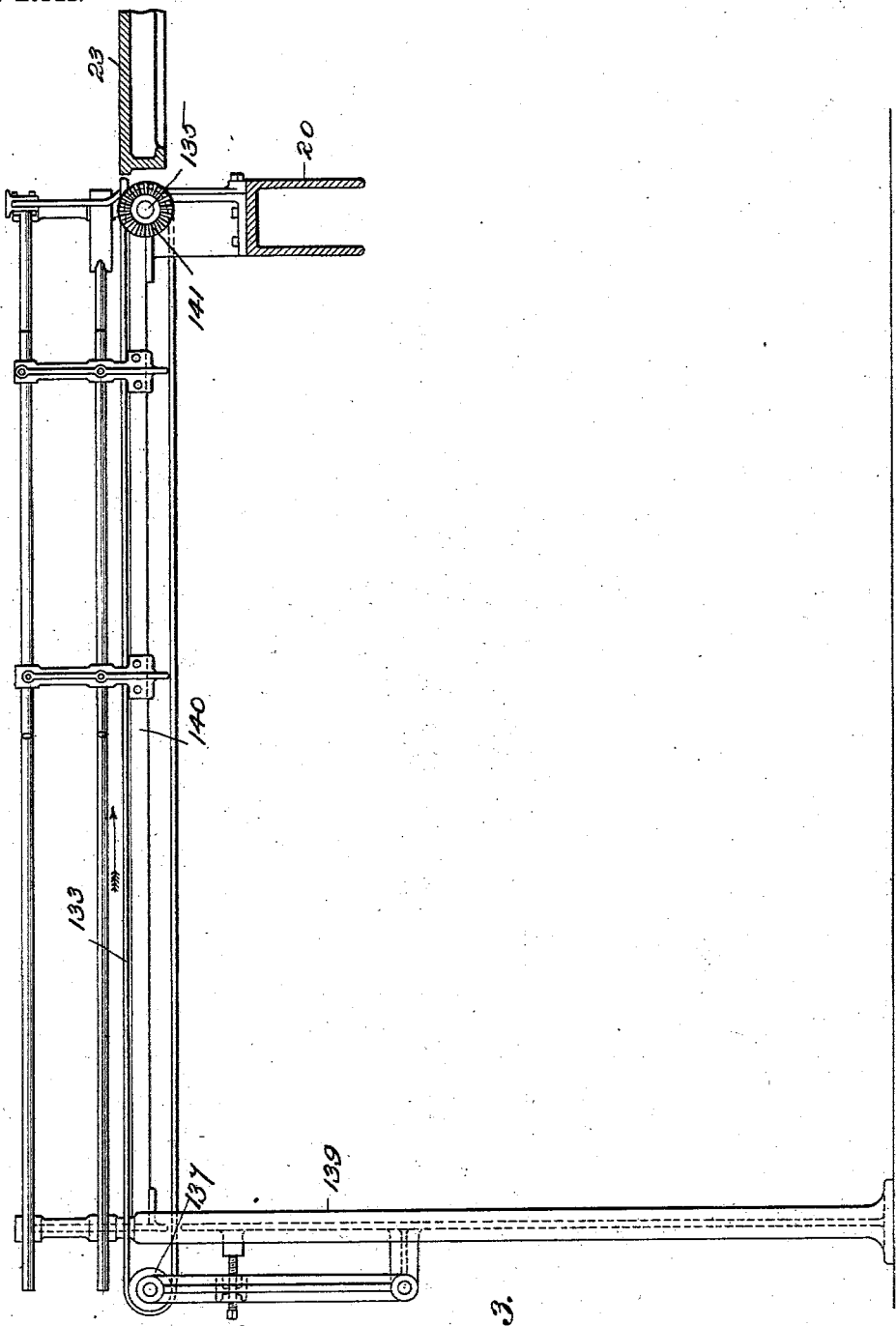
Figure 4:
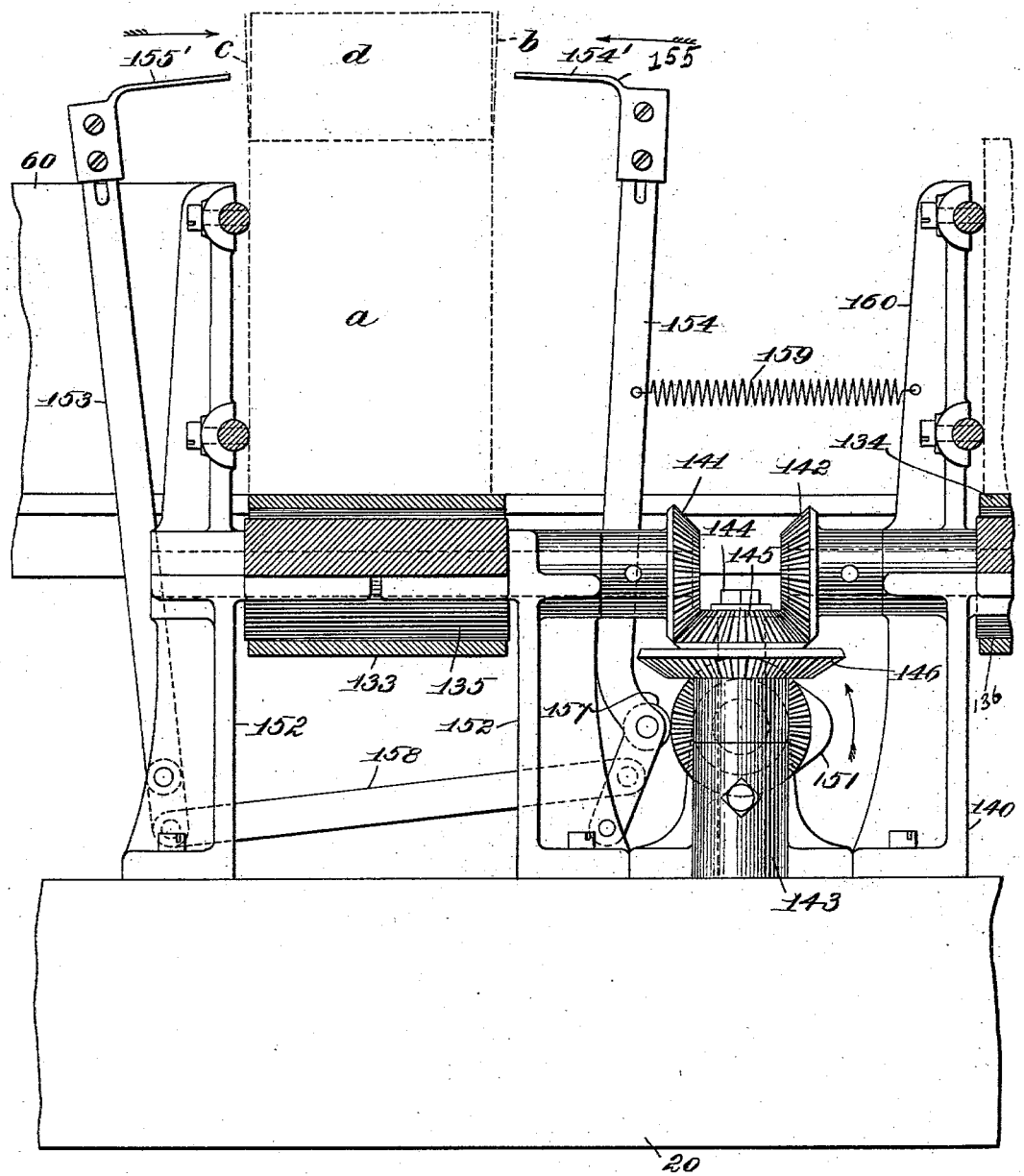
Figure 11:
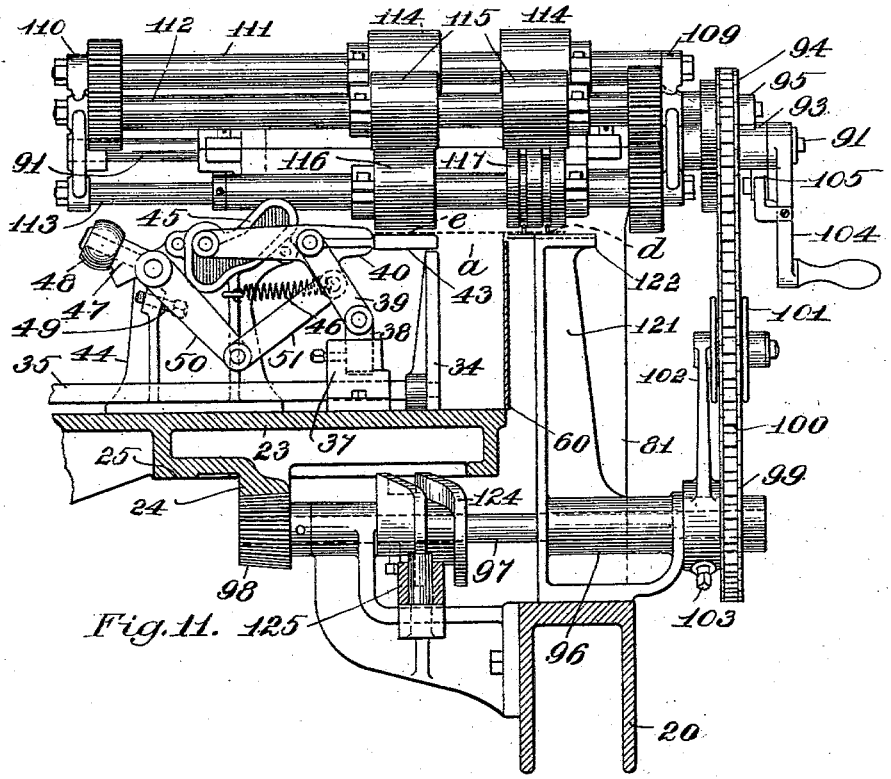
Figures 12, 13:
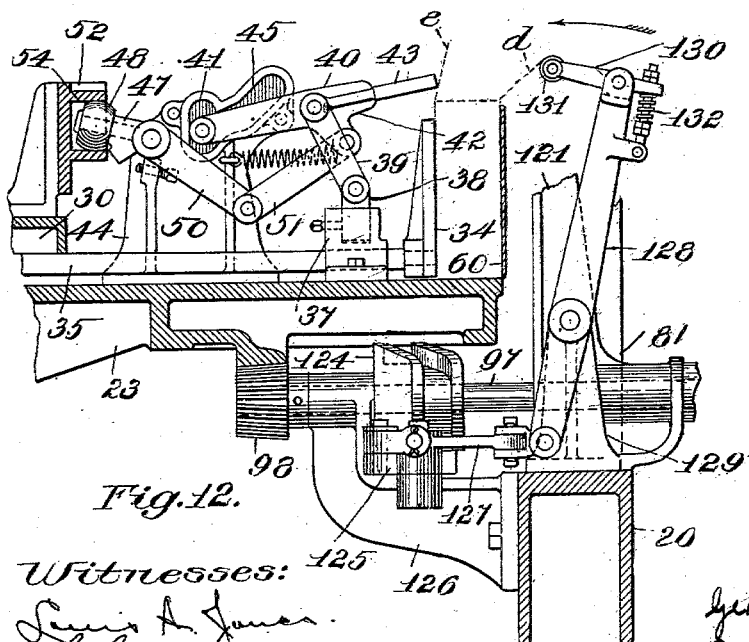

Figure 1 represents a plan view of the improved machine closing and sealing the carton. Fig. 2 represents a cross-sectional view of the same, taken on line 2 2, Fig. 1, to more clearly illustrate the carrier and its main driving means. Fig. 3 represents a side elevation of the feed-belt with a partial sectional view of the carrier-bed. Fig. 4 represents a cross-sectional view of the feed-belt, also illustrating the feed and delivery driving means and the tuckers for tucking inward the first pair of flaps. Fig. 5 represents a detail view of parts of the feed and delivery drive-gear. Fig. 6 represents a sectional view taken on line 6 6, Fig. 1, to show the second flap closer or tucker and its driving means, Fig. 7 representing the same in end view and in relation to the second flap-turner. Fig. 8 represents a plan view of portions of the carrier to more clearly illustrate the construction thereof and the means whereby the carton is positioned against the walls of the carrier-pocket. Fig. 9 represents a side elevation of parts of the same with an edge view of the second folder-plate, the carton being indicated in broken lines and showing the position of the first and second flaps at this point in the operation. Fig. 10 represents a view in end elevation of the glue-applying mechanism with its driving mechanism and its detector-controlled tripping device. Fig. 11 represents a cross-sectional view taken on line 11 11, Fig. 1, disclosing the gluing mechanism in side elevation and in relation to the folder for the fourth flap, the plate of which folder at this time forming a support for said flap. Fig. 12 represents a sectional view taken on line 12 12, Fig. 1, and disclosing the fourth flap-turner in the elevated position in which it acts to turn the fourth flap inward sufficiently to hold the first and second flap from swinging upward without interfering with the turning inward of the third flap, the mechanism for effecting the turning inward of the third flap being also illustrated in this figure, Fig. 13 representing a view in elevation of the cam for actuating the fourth folder, the dwell in the cam-path providing for a rest in this mechanism while the third flap is being turned down and its folder is being retracted. Fig. 14 represents a sectional view of the carrier-bed with the fourth folder in the projected position as its actuating-arm is leaving the actuating-cam, Fig. 13, and showing the construction of this folding mechanism as well as the construction and operation of the carton-ejecting device. Fig. 15 represents a view of the retractor-cam by engagement with which the actuating-arm of the fourth folder is operated to cause the retraction of the folder-plate.

Similar numbers of reference designate corresponding parts throughout.

As shown in the drawings in its preferred form, the mechanism is mounted on the main frame 20, which is supported on suitable standards 21 21 and has the vertical spindle 22 fixed in the center of said frame 20, as will be seen by reference to Fig. 2 of the drawings. On the spindle 22 is rotatably mounted the circular table 23, having or provided with at its under side the annular rack 24 and the annular track 25, the main frame 20 being supplied with a series of roller-bearings 26 26 on which the rack 24 travels, and the main frame 20 being provided with bearings in which is journaled the main drive-shaft 27, furnished with the belt-pulley 28 and with the bevel-gear 29 engaging with the teeth of the track 25 to cause the rotation of the table 23 when the shaft 27 is driven.

On the upper portion of the spindle 22 is fixed the cam-plate 30, having the cam-path 31, the purpose of which will hereinafter be described, this cam-plate also being designed as a support for portions of the mechanism.

Mounted on the upper surface of the table 23, at or near periphery thereof, is a series of vertical plates 32, each adapted to bear against one end or side of a carton to carry the same along through the several operations, and from the outer edge of these plates 32 extended inwardly on said table 23 the clearance-plates 33, the rear inner end of each of these clearance-plates being separated from the next succeeding plate 32 by a distance approximately equal to the side extension of a carton on which this machine is designed to operate.

The space between the rear edge of each of the plates 33 and the forward surface of the next succeeding plate 32 is closed by the ejector-plate 34, mounted on the rod 35, (see Figs. 8 and 14,) which is movable in slides carried by the table 23, and is provided at its inner end with a bearing 36, which works in the cam-groove 31 of the plate 30.

At the rear of each of the plates 34 is secured to the table 23 a socket member 37, which may have a guide-slot for the rod 35, and in the socket is adjustably secured the stud 38, to which is pivoted the link 39, the upper end of this link being pivotally secured to the folder-plate arm 40, which has the bearing 41, the depending projection 42, and the fourth folding and pressing plate 43. (See Fig. 14.)

On the table 23 between the cam-plate 30 and each of the socket members 37 is mounted a bracket 44, having at its upper portion the cam 45, in which the bearing 41 of the folder-plate arm 40 works, the bracket 44 being furnished with the retracting-spring 46, connected with the bracket and with the link 39. At the rear of the bracket 44 is pivoted the arm 47, provided at its free end with the rotatable sleeve 48, the surface of which is spherical, the downward movement of this arm being limited by the set-screw 49, carried by the bracket. Fixed to this arm 47 is the lever 50, which is connected by the pivoted link 51 with the projection 42 of the arm 40. (See Figs. 11, 12, and 14.)

The arm 47 is actuated at times to project the folder-plate arm forward by the cam 52, mounted on the cam-plate 30, (see Figs. 1, 12, and 13,) and having the entrance 53, the dwell 54, and the exit 55, through which the sleeve 48 of said arm works approximately during the gluing and folding operation, the retraction of the folder-plate arm by the spring 46 being permitted by the elevation of the free end of the arm 47 as its sleeve works through the cam 56, located on the cam-plate 30, opposite the ejecting position, and having the guard 57 to insure the depression of the arm 47 at this point and the upwardly-inclined channel 58, through which the sleeve 48 works, as will hereinafter be more fully described.

On standards as 59, Fig. 9, secured to the main frame 23, is mounted a vertical curved plate 60, Figs. 1, 8, and 9, extending for a suitable distance to form a closure for the pockets carrying the cartons during the gluing and folding operations. This plate 60 has an opening through which the finger 61 works, the pivot of this finger being journaled in the bearing 62, secured to the outer surface of said plate and having lever 63, which is connected by the spring 64 with the screw 65, adjustably mounted in the bracket 66, secured to said plate 60.

Mounted on the main frame 20 adjacent to the feeding-in point is the standard 67, Figs. 6 and 7, having at its lower portion a bearing in which the shaft 68 is journaled. At the inner end of this shaft is mounted the bevel-gear 69, meshing with the rack 25 of the table 23, and at the outer end of the shaft is the plate 70, having the cam-path 71, the plan of which is shown in Fig. 7. At the upper portion of the standard 67 is a bearing in which is journaled the shaft 72, having at its inner end the arm 73, carrying the flap-tucker 74, and at its outer end the lever 75, pivoted to the arm 76, which extends downward, having a yoke 77 at its lower end which embraces the shaft 68 and a bearing 78 which works in the cam-path 71.

Adjacent to the standard 67 is mounted the horizontal plate 79, having the upwardly-extending end 80, contracted in width, as shown in Fig. 1, and designed to turn down the end flap of a carton, as is shown in Fig. 9, while the main portion of this plate is sufficiently wide and the edges are so curved as to cause the turning outward of the side flaps of the carton when such carton is moved under this plate.

The rear or widest portion of the plate 79 is secured to the standard 81, mounted on the main frame 20, and has an opening near this standard in which the detector-plate 82, Fig. 10, may work, this plate being mounted to swing on the shaft 83, journaled in bearings in the standard 81, and having the stud 84 and the tripper-arm 85 furnished with the engaging plate 86. The stud 84 being connected by the spring 87 with the upper end of the standard 81 is under constant tension to rotate the shaft 83 to swing the arm 85 to the left, as shown in said Fig. 10, and to swing the detector-plate 82 downward, while the rotation of the shaft in such direction is yieldingly resisted at a suitable point by the spring 88, mounted on the screw 89, which is secured in the arm 85 and works through a perforation in the upper part of said standard 81, the spring 88 bearing against the head of the screw 89 and against said standard.

At the upper portion of the standard 81 is mounted the glue-reservoir 90 of any usual construction, and journaled in bearings above this reservoir is the main glue-roll shaft 91, carrying the glue-supply roll 92, the periphery of which works through the glue-reservoir. On this shaft 91 is mounted the ratchet 93, and journaled on the shaft is the sprocket 94, having the pivoted pawl 95, adapted to engage the teeth of the ratchet 93 to drive the same and cause the rotation of the glue-roll when the sprocket is driven.

Journaled in the bearing 96 at the lower portion of the standard 81 is the shaft 97, having the bevel-gear 98, meshing with the teeth of the track 25, and a cam, the office of which will hereinafter be described. On the outer end of the shaft 97 is mounted the sprocket 99, and working over the sprockets 94 and 99 is the drive-chain 100, the slack of which is taken up by the grooved pulley 101, journaled on the stud-shaft of the arm 102, this arm being adjustably mounted on the bearing 96 and secured in place thereon by means of the set-screw 103.

Provision for rotating the glue-roll shaft by hand is supplied by the handle 104, the arm of which is journaled on the said shaft 91 and being furnished with the pivoted pawl 105, which is adapted to engage with the teeth of the ratchet 93, the face of this ratchet being sufficiently broad to permit the pawls 95 and 105 to clear each other.

Pivoted at the end of the glue-reservoir are arms, as 106, Fig. 10, carrying the journaled doctor-roll 107, bearing on the periphery of the glue-supply roll 92 to cause the equal distribution of thereover and adjustable in such bearing relation by screws, as 108, mounted on the glue-reservoir and working in threaded perforations in said arms 106.

Mounted to swing on the glue-roll shaft 91 are the frames 109 and 110, and in these frames are journaled the shafts 111, 112, and 113, geared together and having respectively the glue-transmitting rolls 114 114, 115 115, and 116 and 117, these latter being on the shaft 113 and the roll 117, having annular grooves, as shown in Fig. 11. The rolls 114 114 of the shaft 111 bear against the periphery of the glue-roll 92, and under the frictional driving from said roll and the gear connections between the glue-transmitting rolls causes the rotation of these rolls 114 to 117, inclusive, in the directions indicated by their related arrows in Fig. 10.

Rigidly mounted on the frame 109 is the controller-arm 118, which extends approximately to the position of the tripper-arm 85 and has an end adapted to be engaged by the plate 86 or its equivalent on said arm. At a point above the shaft 91 this controller-arm is furnished with a cam-roll 119, which rides on the periphery of the cam 120, carried on the shaft 91, whereby on the rotation of this shaft while the end of the controller-arm is engaged by the tripper-arm the controller-arm is caused to swing up and down, following the throw of said cam, and the frames 109 and 110 and their rolls 114 115, and particularly 116 and 117, are also moved upward and downward, the downward movement being limited by the engagement referred to between the controller-arm and the tripper-arm. When, however, the end of the controller-arm is released from such engagement, the frames 109 and 110 may swing to carry the rolls 116 and 117 below such point, as will hereinafter be more fully explained, while the driving of the rolls by means of their gears and transmission of the glue to the rolls 116 and 117 will be continuous during the rotation of the glue-roll.

The standard 121 is formed in part with or secured adjacent to the standard 81 and has the upper horizontal table 122 furnished with the spring-arms 123, this table being on a level with the upper surfaces of the folder-plates 43 when such plates are retracted, as is shown in Fig. 11 of the drawings, and the upper surface of the plates 43 and the table 122 being designed to support the side flaps of a carton in position to receive glue from the rolls 116 and 117, while the spring-arms 123 are designed to raise the flap from the table 122 after the application of glue.

The cam 124 on the shaft 97, above referred to, is designed to operate the third folder. (See Figs. 11 and 12 of the drawings.) Engaging with this cam is the bearing 125, pivotally mounted on the bracket 126, which is in turn supported from the frame 20, said bearing being pivotally connected by the link 127 with the lower end of the arm 128, mounted to swing on a pin extending from the standard 129. At the upper end of this arm 128 is pivoted the frame 130, carrying the roll 131 and furnished at its rear end with the spring-lifting device 132, carried by a stud on the arm 128 and acting to depress the roller end of the frame.

The preferably filled cartons are fed to the machine by a continuously-operated belt 133 and are received from the machine by the similarly constructed and operated belt 134, driven in an opposite direction to that of the belt 133. (See Figs. 1, 3, and 5.) These belts are mounted at their inner ends on rolls 135 and 136, Fig. 1, journaled in bearings which are supported on the main frame 20 to bring the upper reaches of the belts on a level with the upper surfaces of the table 21. At their outer ends these belts travel over rolls, as 137, Fig. 1, which are journaled in frames, as 138, adjustably mounted on standards, as 139, connected with the bearing-brackets of the respective rolls 135 and 136 by rigid members 140 and these members being furnished with any suitable guard-frames to prevent the falling off of the cartons.

The rolls 135 and 136 have bevel-gears 141 and 142, and between these gears is journaled in the bracket 143 (see Figs. 1, 4, and 5) the vertical shaft 144, having the bevel-gears 145 and 146, that marked 145 meshing with the gears 141 and 142 to drive said gears and the belts on their respective rolls in opposite directions, while the gear 146 is engaged with the bevel-gear 147 on the shaft 148, which is journaled in the sleeve 149 of the bracket 143 and has the bevel 150, meshing with the track 25 of the table 23 and the cam 151.

On the brackets 152 152, which support the roll 134 of the belt 132, are pivoted the tucker-arms 153 and 154, having the primary tucker-blades 155 and 156. The arm 154 has the roller-bearing 157, against which the cam 151 works, while the extension of the arm 153 below its pivot is connected by the pivoted rod 158 with the arm 154 above its pivot, so that the throw of the cam 151 against the bearing 157 causes the swinging of said arm 154 toward the belt 133, while the connecting-rod 158 causes the operation of the arm 153 in the opposite direction to move its upper portion and the blade 155 also toward said belt, the retraction of said arms being effected by the action of the spring 159, connected with the arm 154 and with the frame 160 of the receiving device.

When the main drive-shaft 27 is rotated, the table 23 is driven by the engagement of the gear 29 with the track 25 of said table, and at the same time this track in its movement causes the rotation of the shafts 68, 97, and 148 through the engagement of the gears of these shafts with the track 25, and thus driving the mechanism connected with said shafts.

Particular attention is here called to the fact that the table 23 is thus caused to rotate and carries with it the series of pockets formed by the plate 32 and 33 and the ejector-plates 34, as also the series of last folder-plates and their mechanism, of which one is provided for each "pocket," (so called.) Notice should also be taken that the projector-cam 52, Fig. 13, and the retractor-cam 56, Fig. 15, are fixed in their respective positions on the cam-plate 30, while the ejector-cam is preferably formed in part with such cam-plate 30 and has a throw located at or near the position of the cam 56, so that the action of this ejector-cam on the rod of any particular ejector-plate will commence at or about the time, preferably immediately after, the cam 56 acts on the sleeve 48 of any particular last folder and presser to cause the releasing of the carton from the pressure of the plate 43 of such mechanism.

A series of preferably filled cartons are placed on the feed-belt 133 and fed inward toward the table 23, and as the respective cartons reach the position indicated in broken lines in Fig. 4 of the drawings the cam 151 causes the arm 154 to move inward toward the carton *a*, and this movement of the arm is transmitted by the rod 158 to the arm 155 to swing that arm inward, the tucker-plates 154' and 155' being thus moved to strike on the end flaps *b* and *c* of the carton to bend them inward, and the spring 159 then acting to quickly retract the arms, so that their tucker-plates will not interfere with the progress of the carton. The carton *a* passes from the belt 133 onto the surface of the table 23 against the ejector-plate 34, which at this time forms the back of the pocket, the carton thus passing onto said table being pushed forward by the next succeeding carton until it (the first-mentioned carton) is fully on the table and is located with the end corresponding to the flap *b*, Fig. 4, approximately against the plate 32. As the table 23 moves onward the forward end of the carton is brought against the feeler-plate 61, the spring resistance on which is sufficient to crowd the carton backward against the plate 32, this being slightly subsequent to the movement of the carton within the limits of the retaining-plate 60. After such position of the carton the resistance of the spring 64 is overcome by the movement of the carton against the plate 61 and this plate is swung outward on its pivot to permit the passage of the carton. The further movement of the carton now carries it beneath the tucker-plate 74, the operating mechanism of which is so timed that this tucker now acts on the flap *b* to turn the same down to the position indicated in Fig. 9 of the drawings, while at approximately the same time the forward end of the carton is brought under the contracted bent portion 80 of the plate 79 and the flap *c* is thus turned down over the flap *b*, immediately after which the outwardly-expanding edges of this plate 79, acting on the flaps *d* and *e*, causes the swinging outward of such flaps until they extend horizontally against the under surface of the main portion of said plate 91. The continued movement of the table 23 now carries the carton under the detector-plate 82, which riding upward over the flap *c* and *b* effects the swinging outward of the tripper-arm 85 to release the controller-arm 118 and to permit the swinging downward of the roll-carrying frames to a point where the rolls 116 and 117 may apply glue to the inner surfaces of the flaps *d* and *e*, which at this time rest on and are supported the flap *d* by the top 122 of the standard 121 and the flap *e* by the upper surface of the folder-plate 43, as is indicated by dotted lines in Fig. 11 of the drawings, the glue being transmitted from the main glue-roll 92 to the glue-applying rolls 116 and 117 by means of the rolls 114 and 115. When the roll 117 is again moved upward from its pressure on the flap under the action of the controller-arm 118 and its associated mechanism, the spring-fingers 123 tend to lift the flap *d* from the top 122 of the standard 121. At or about the completion of the glue-applying process thus described the spherical sleeve 48 of the last folder associated with this particular pocket enters in engagement with the path of the cam 52, fixed on the cam-plate 30 approximately opposite the glue-applying position, and as this sleeve bears against the wall 53 of this cam said sleeve is slightly depressed until it enters the dwell 54 of the cam. The result of this downward movement of the sleeve 48 is to cause the proportionate upward movement of the lever 50 and the swinging upward and moving slightly forward of the folder-arm 40 and its plate 43, thus swinging the flap *e* upward from its flattened position on the upper surface of the plate 43 and also swinging said flap *e* inward until it is in the position indicated in Fig. 12 of the drawings, where it prevents the springing upward of the flaps *b* and *c*, while still remaining beyond the radius of the flap *d*. At this point the sleeve 48 travels through the short dwell portion 54 of the cam 52, and no change in its related parts is made during this period. During the dwell of the folder-plate 43 the cam 124 is rotated by the shaft 97 to actuate the bearing 125, thus throwing the arm 127 to swing the third folder-lever 128, by which means the folder-roll 131 and its frame 130 are carried inward to turn down the flap *d*, so that its glued inner surface will be brought against the upper surface of the flap *c* and against that portion of the flap *b* which is not covered by the flap *c*. The sleeve 48 of the last folder mechanism is now carried through the lower part of the cam 52 and leaves said cam at its exit 55, and the arm 47 and its lever, with the related mechanism, are operated to project the plate 43 first over the carton to turn inward the last flap *e* and then downward to press the glued surface of such flap *e* down onto the upper surface of the flap *d*, and being left in this position this plate 43 acts as a presser on the flaps until the particular carton is carried around by rotation of the table 23 nearly to the ejecting position or until the cam 56 is reached.

The guard 57 of the cam 56 (see Fig. 15) is designed to control any accidental rising of the arms 47 of the last folder devices, so that the sleeves 48 of said arms may readily enter the camway 58, as where accidental pressure on the plates 43 lifts the same and depresses the bearing 41 below the holding portion of the cam 45, in which case the spring 46 would tend to retract the folder-plate arm 40 and reset the arm 47 in the raised position. As the sleeve 48 moves upward through the camway 58 the lever 50 swings downward and draws the link 51 and the connected folder-plate arm 40 backward until the bearing 41 of said arm 40 is free from the holding portion of the cam 45, the spring 46 being then permitted to act to retract the parts to their normal position. At or about this time the pocket has brought the carton opposite the belt 134, and the bearing 36 of the ejector-arm 35 enters the eccentric portion or throw of the cam 31 on the plate 30, thus carrying the arm 35 and its ejector-plate 34 outward and forcing the carton from the table 23 to the upper reach of the belt 134, which operating outward carries the sealed carton away from the machine.

When the machine is operated without the presence of cartons or when no carton is present in the particular pocket passing under the detector-plate 82, Fig. 10, such plate is not raised and engagement between the tripper-arm 85 and the controller-arm 118 is maintained, thus preventing the frames 109 and 110 from moving downward sufficiently to bring the rolls 116 and 117 into contact with the upper surface of the particular folder-plate 43 and of the top 122 of the standard 121 to prevent the accidental application of glue to such parts.

The handle 104, Figs. 10 and 11, is intended for use in rotating the glue-roll by hand on the starting of the machine to thus insure the distribution of the glue on the surface of the glue-roll and to in a degree mix the glue.

The upper portion of the wall or plate 60 at the point opposite to which the folder-plates 43 are projected to close the flap serves to reinforce the carton against the lateral pressure exerted by such plates on the cartons and prevents the crowding outward of the upper portions of the carton.

The cartons herein described as being under operation are stated to be "preferably" filled, as the machine is designed primarily to close the ends of filled or partially-filled cartons; but it is not my intention to restrict this machine to the operation of closing the ends of filled cartons or for closing the upper ends of cartons the lower ends of which have been previously closed and sealed, for it is evident that the same or similar closing and sealing devices may be utilized to close the bottom flaps of cartons when said cartons are suitably supported in the machine and then subsequently when these cartons are reversed and again passed through the machine for closing the top flaps thereof.

I do not desire to limit myself to the specific mechanism herein described, but only as herein claimed, as I am aware that various modifications of the mechanism herein shown may be utilized to accomplish the same results.

Having thus described my invention, I claim as new and desire to secure by Letters Patent—

1. A carton-closing machine comprising a table rotatably mounted means for continuously rotating said table, means for continuously moving cartons toward the periphery of the table, and means for periodically moving cartons from said table.

2. A carton-closing machine comprising a table rotatably mounted, a pair of belt-rolls journaled on bearings, adjacent to the periphery of the table, driving connections between such rolls and the table for driving said rolls in opposite directions, tucker-arms pivotally mounted at the sides of one of said belts and connected to be swung in opposite directions and means included in said roll-driving mechanism for causing the swinging of one of said arms.

3. A carton-carrier, for a machine of the character described, comprising a circular table rotatably mounted, means for feeding a carton to the surface of said table, and means for resisting the movement of the carton in the direction in which the table travels until the carton is wholly on the table.

4. In combination a rotatable table, a wall fixed thereon at an angle to its course of travel, means for feeding a carton to the surface of the table before said wall, and means for resisting the movement of the carton with the table until said carton is wholly within the peripheral line of the table.

5. In combination a rotatable carton-carrier table, a series of radially-extending walls mounted on the surface of the table, means for feeding cartons to the surface of the table at the distance from said walls, and means for resisting the movement of the cartons with the table until said cartons are engaged by said walls.

6. In a carton-closing machine a carton-carrier having a wall inclined to the path of movement of the carton in being fed thereto, a wall positioned at a distance from such inclined wall and approximately parallel to said path of movement of the carton a movable element adjacent to said last-mentioned wall, means for feeding a carton toward such inclined wall, and means for positioning the carton against the parallel wall.

7. In a carton-closing machine, a circular rotatable table having a series of pockets each of which has a radial wall and an inclined wall, and a movable wall located between the radial wall and the inclined wall.

8. In a carton-closing machine, a circular rotatable table having a series of pockets on its upper surface each of said pockets comprising a pair of rectangularly-extending walls, one of which is movable, and an inclined wall leading toward the movable wall.

9. In a carton-closing machine, a circular rotatable table having a series of pockets on its upper surface, each of said pockets comprising a radially-extending wall, a wall inclined to the periphery of the table, and a wall forming the back of the pocket and movable toward and from the periphery of the table.

10. In a carton-closing machine, the combination with a movable carrier having a pocket larger than the carton intended to be received thereby, of a yielding pressure device adapted to work in said pocket at times and adapted to be swung out of said pocket.

11. In a carton-closing machine, the combination with a rotatable table provided with a series of pockets, of a wall fixed on a support independent of said table, and a pressure device yieldingly mounted on said wall and adapted to work in said pockets at times.

12. In a carton-closing machine, the combination with a movable carton-carrier provided with a series of pockets each having a contracted forward portion and a fixed rear wall, of a plate independent of said carrier and adapted to close the front portion of said pockets at times and a spring-actuated pressure device mounted on said wall and working in the pocket opposite thereto.

13. In a carton-closing machine, the combination with a circular rotatable table provided with a series of radial pocket-plates extending approximately to the periphery of said table, of a pressure-arm yieldingly mounted outside the path in which said plates move and adapted to work in said path at times and to be swung out of such path under pressure.

14. In a carton-closing machine the combination with a circular rotatable table having a series of pockets on its upper surface, of a curved plate mounted adjacent to the periphery of said table but on a support independent thereof, and an arm pivotally mounted, on said table and working through an opening therein, and spring means for resisting the swinging of said arm.

15. In a carton-closing machine the combination with a circular-rotatable carrier-table having a series of pockets larger than the cartons to be received, each of said pockets having a contracted forward portion, of means for continuously feeding cartons to said pockets, whereby the cartons are fed into the contracted portions of the pockets, fixed means for preventing the movement of the cartons with the table until the wider parts of the pockets are brought opposite the cartons, and means for exerting a yielding pressure on the cartons after they are wholly received by the pockets.

16. In a carton-closing machine the combination with a carton-carrier, of flap-spreading means mounted above the carrier, and means other than said spreading means for supporting the flaps when spread.

17. In a carton-closing machine, the combination with a carton-carrier, of flap-spreading means mounted above the carrier, and means for supporting one of said flaps being movable with the carrier.

18. In a carton-closing machine, the combination with a carrier provided with a series of pockets, and a flap-support located adjacent to each pocket, of means for turning outward one of the carton-flaps onto said support.

19. In a carton-closing machine the combination with carton-carrying means, flap-spreading means, and flap-supporting means, of glue-applying means, adapted to work toward and from the flap-supporting means, and means for controlling the movement of the glue-applying means.

20. In a carton-closing machine, the combination with carton-carrying means, flap-spreading means and flap-supporting means, of a detector mounted above the carton-carrying means, glue-applying means, and means connected with said detector for controlling the glue-applying means.

21. In a carton-closing machine, the combination with carton-carrying means, flap-spreading means, and flap-supporting means adapted to work toward and from said supports, a detector positioned to be acted upon by a carton in said carrier, and controlling connections between the detector and the glue-applying means.

22. In a carton-closing machine, the combination with carton-carrying means, flap-spreading means, and flap-supporting means, of glue-applying means mounted to work toward and from said supports, a detector movably mounted on the spreader, and controlling connections between the detector and the glue-applying means.

23. In a carton-closing machine, the combination with carton-carrying means, flap-spreading means, and flap-supporting means, of glue-applying means, a frame, movably mounted, in which said glue-applying means is carried, a lever on said frame, a detector movably mounted in the path of the cartons, and a releasable connection between the detector and said lever.

24. In a carton-closing machine the combination with carton-carrying means, flap-spreading means, and flap-supporting means, of a frame mounted to swing above said flap-supports and having a controlling-lever, glue-applying devices in said frame, a detector-plate pivotally mounted in the path of the cartons, and an arm connected with said detector-plate and adapted to reasonably engage the lever of the glue-applying frame.

25. In a carton-closing machine, the combination with carton-carrying means, of a glue-reservoir mounted above such means, a glue-roll journaled in the reservoir, frames mounted to swing and carrying glue transmitting and applying rolls, a lever on said frame, and a detector mounted in the path of the cartons and having an arm releasably engaged with said lever.

26. In a carton-closing machine, a glue-applying mechanism comprising a main glue-roll and its shaft, a cam on said shaft, means for driving such shaft, a frame pivotally mounted on the shaft and carrying glue-applying devices, a lever extending from said frame and provided with a bearing against which the cam on the glue-roll shaft works, an arm pivotally mounted and adapted to engage said lever, and a detector for causing the swinging of said arm out of engaging position when a carton is present under such detector.

27. In a carton-closing machine, glue-applying mechanism comprising a frame mounted to swing and carrying glue-applying devices, a lever fixed to said frame and provided with a roller-bearing, a cam rotatably mounted and working against said bearing, an arm pivotally mounted and adapted to engage said lever to prevent the lifting of one end thereof, and means adapted to be acted upon by a carton for releasing said arm from the lever, whereby the swinging of the lever is prevented during such disengagement.

28. In a carton-closing machine, the combination with a carton-carrier of a pair of flap-supports one of which is fixed, the other of said supports being movable with relation to the flap supported thereby.

29. In a carton-closing machine, means for supporting a pair of carton-flaps during the application of glue, one of such supports being mounted on a movable arm.

30. In a carton-closing machine, means for swinging inward the fourth flap to a position to hold the first and second flaps in position.

31. In a carton-closing machine, means for folding inward the end flaps, and means for turning inward one of the side flaps to hold said end flaps in position, during the folding inward of the remaining flap, and for then continuing the folding inward of the first-mentioned side flap.

32. In a carton-closing machine, the combination with carton-carrying means, of a flap-support mounted to travel with such means.

33. In a carton-closing machine, the combination with carton-carrying means provided with a pocket, of a flap-support mounted on said carrying means adjacent to said pocket.

34. In a carton-closing machine, the combination with carton-carrying means, a flap-support movably mounted thereon, and means for moving said support, of flap-closing means movably mounted outside the path of said carrier, and means for moving said flap-closer over the carrier.

35. In a carton-closing machine, the combination with carton-carrying means having a pocket, of a flap-support movably mounted at one side of said pocket, and means for raising said support at times.

36. In a carton-closing machine, the combination with a fixed wall, of a carton-carrier movable with relation to said wall, and a flap-closing device movably mounted on said carrier, and means for moving the flap-closing device toward said wall.

37. In a carton-closing machine, a movable flap-closing device constructed and normally positioned to act as a flap-support, and means for elevating said device and projecting the same over the carton.

38. In a carton-closing machine, the combination with a carton-carrier having a pocket, of a flap-closing plate movably mounted on the carrier and adapted, in its retracted position, to act as a flap-support, of operating means for said plate adapted to elevate said plate and project the same over the pocket.

39. In a carton-closing machine, the combination with means for holding the carton, of a flap-closing plate movably mounted, and means for elevating said plate and partially projecting the same forward, and means for holding said plate in this partially-projected position for a time.

40. In a carton-closing machine, the combination with a carton-carrier furnished with a carton-holder one wall of which is lower than the carton designed to be operated upon, of a flap-closing plate adapted, in its retracted position to extend to the inner surface of said wall, and means for elevating and projecting said plate over said carton-holder.

41. In a carton-closing machine, the combination with a carton-holder in the nature of a pocket, of a combined flap-support and closing-plate, mounted to move with the carton-carrier, and means for projecting the said plate over said holder at times.

42. In a carton-closing machine, the combination with a movable carton-carrier, and a flap-closing device operatively mounted thereon, and including a lever, of fixed means for intercepting said lever and adapted to give the lever a two-step movement in a single general direction, whereby a dwell in the movement of the lever is effected.

43. The combination with the table 23, rotatably mounted on the spindle 22 fixed in a support, and having the rack 24, and the shaft 27 journaled in bearings and having the gear 29 meshing with the rack 24, of means for continuously feeding cartons to such table.

44. The combination with the spindle 22, a support therefor, the table 23 journaled on the spindle, and means for driving the table, of the plates 32 having the inclined members 33, and means for closing the space between the end of one member 33 and the succeeding plate 32.

45. The combination with the table 23, and the series of plates 32 having the inclined member 33, mounted thereon, of a series of plates movably mounted and working between the rear ends of the respective members 33 and the surfaces of the succeeding plates 32.

46. The combination with the spindle 22, a support therefor, the table 23 journaled on the spindle, and the cam-plate 30 fixed on said spindle and having the cam 31, of a series of plates movably mounted on the table 23 and having arms furnished with bearings working in the cam 31.

47. The combination with the spindle 22, a support therefor, the table 23 journaled on the spindle, means for driving the table, and the plate 30 fixed on said spindle and having the cam 31, of the plates 32 fixed on said table, and having the inclined members 33, and the plates 34 mounted on the arms 35 which are mounted in guides on the table and have bearings working in the cam 30.

48. The combination with the spindle 22, a support therefor, the table 23 journaled on said spindle, means for driving the table, the plate 30 fixed on the spindle, and the cams 52 and 56 fixed on the plate 30, of a flap-closing mechanism mounted on the table and having an operable part adapted to work through said cams and to be actuated thereby.

49. In a machine of this nature, and in combination with a flap-closing mechanism having an engageable arm, the cam 52 having the entrance 53, the dwell 54, and the exit 55, as and for the purpose described.

50. In a machine of this nature, and in combination with a mechanism having an engageable arm, the cam 56 having the guard 57 and the cam-groove 58, as and for the purpose described.

51. The combination with the table 23, a central support on which the table is journaled, and the plate 30 fixed on said support, of the block 37 mounted on said table, the link 39 pivotally mounted on said block, the arm 40 pivoted to said link and having the plate 43 and the bearing 41, the cam in which said bearing works, the arm 47 pivoted to the cam-block and having the lever 50, the rod 51 pivoted to the lever 50 and to the arm 40, the retracting-spring connected to the link 39 and to a fixed part of the machine, and means mounted on the plate 30 for causing the swinging of the arm 47 as and for the purpose described.

52. The combination with the spindle 22 and its support, the table 23 journaled on said spindle, the plates 32 having the inclined members 33 secured to the table, and means for closing the spaces between the rear ends of the members 33 and the forward ends of the next succeeding plates 32, of the plate 60 mounted on supports independent of said table and adapted to close the front portions of the pockets thus formed, as and for the purpose described.

In testimony whereof I affix my signature in presence of two witnesses.

GEORGE R. WYMAN.

Witnesses:
   H. H. MILLER,
   HENRI E. DAVENPORT.